United States Patent Office 3,336,221

Patented Aug. 15, 1967

3,336,221
METHOD OF INHIBITING PRECIPITATION AND SCALE FORMATION

Paul H. Ralston, Bethel Park, Pa., assignor to Calgon Corporation

No Drawing. Filed Nov. 5, 1964, Ser. No. 409,300
16 Claims. (Cl. 210—58)

This invention relates to methods of inhibiting scale formation and/or the formation of solid scale-forming salts in water or brine comprising adding to said water or brine small amounts of certain amino phosphonate compounds.

Most commercial water contains alkaline earth metal cations, such as calcium, barium, magnesium, etc., and several anions such as bicarbonate, carbonate, sulfate, oxalate, phosphate, silicate, fluoride, etc. When combinations of these anions and cations are present in concentrations which exceed the solubility of their reaction products, precipitates form until these product solubility concentrations are no longer exceeded. For example, when the concentrations of calcium ion and carbonate ion exceed the solubility of the calcium carbonate reaction product, a solid phase of calcium carbonate will form.

Solubility product concentrations are exceeded for various reasons, such as evaporation of the water phase, change in pH, pressure or temperature, and the introduction of additional ions which form isoluble compounds with the ions already present in the solution.

As these reaction products precipitate on the surfaces of the water carrying system, they form scale. The scale prevents effective heat transfer, interferes with fluid flow, facilitates corrosive processes, and harbors bacteria. This scale is an expensive problem in many industrial water systems, causing delays and shutdowns for cleaning and removal.

Scale-forming compounds can be prevented from precipitating by inactivating their cations with chelating or sequestering agents, so that the solubility of their reaction products is not exceeded. Generally, this requires many times as much chelating or sequestering agent as cation, and these amounts are not always desirable or economical.

More than twenty-five years ago it was discovered that certain inorganic polyphosphates would prevent such precipitation when added in amounts far less than the concentrations needed for sequestering or chelating. See, for example, Hatch and Rice, "Industrial Engineering Chemistry," vol. 31, page 51 at 53; Reitemeier and Buehrer, "Journal of Physical Chemistry," vol. 44, No. 5, page 535 at 536 (May 1940); Fink and Richardson U.S. Patent 2,358,222; and Hatch U.S. Patent 2,539,305. When a precipitation inhibitor is present in a potentially scale-forming system at a markedly lower concentration than that required for sequestering the scale forming cation, it is said to be present in "threshold" amounts. Generally, sequestering takes place at a weight ratio of threshold active compound to scale-forming cation component of greater than about ten to one, and threshold inhibition generally takes place at a weight ratio of threshold active compound to scale-forming cation component of less than about 0.5 to 1.0. Where the scale-forming compound is an alkaline earth metal carbonate, sulfate, oxalate, phosphate, fluoride or silicate, I have found that the threshold active compounds of my invention will inhibit their precipitation from solution when added to the solution in threshold amounts of up to about 100 parts by weight per million parts water (although I prefer up to about 25 p.p.m. for most commercial purposes).

The "threshold" concentration range can be demonstrated in the following manner. When a typical scale-forming solution containing the cation of a relatively insoluble compound is added to a solution containing the anion of the relatively insoluble compound and a very small amount of a threshold active inhibitor, the relatively insoluble compound will not precipitate even when its normal equilibrium concentration has been exceeded. If more of the threshold active compound is added, a concentration is reached where turbidity or a precipitate of uncertain composition results. As still more of the threshold active compound is added, the solution again becomes clear. This is due to the fact that threshold active compounds in high concentrations also act as sequestering agents. Thus, there is an intermediate zone between the high concentrations at which threshold active compounds sequester the cations of relatively insoluble compounds and the low concentrations at which they act as threshold inhibitors. Therefore, one could also define "threshold" concentrations as all concentrations of threshold active compounds below that concentration at which this turbid zone or precipitate is formed.

The polyphosphates are generally effective threshold inhibitors for many scale-forming compounds at temperatures below 100° F. But after prolonged periods at higher temperatures, they lose some of their effectiveness. Moreover, in an acid solution, they revert to ineffective or less effective compounds.

I have discovered that compounds having a methyl phosphonic acid or alkali metal or ammonium salt thereof bonded to a nitrogen atom are threshold active compounds. My invention specifically includes compounds of the general formula $$R''-N\begin{matrix} \diagup R \\ \diagdown R' \end{matrix}$$

where R is $$-CH_2-\overset{\overset{O}{\|}}{\underset{\underset{OM}{|}}{P}}-OM$$

R′ is R or $-CH_2CH_2OH$, and R″ is R, $-CH_2CH_2OH$, or $$-(CH_2)_n-N\begin{matrix} \diagup R \\ \diagdown R \end{matrix}$$

where M is H, $NH_4$, alkali metal, or combination thereof, and "$n$" is 1, 2, or 3. Of the compounds included in the general formula, I prefer to use $$(CH_2)_2N_2[CH_2PO(OM)_2]_4,\ N[CH_2PO(OM)_2]_3$$

or $(CH_2CH_2OH)_2NCH_2PO(OM)_2$ where M is H, $NH_4$, alkali metal, or combination thereof. Not only are these compounds effective inhibitors at room temperatures, but they are also effective at elevated temperatures. Moreover, they retain their effectiveness in acid and salt solution.

I have performed numerous experiments at room temperatures and at elevated temperatures for various lengths of time to demonstrate the effectiveness of different concentrations and forms of these amino methylphosphonic acids and salts thereof in inhibiting the precipitation of various scale-forming salts. In these experiments, I mixed solutions of two soluble salts in the presence of the amino methylphosphonic acid or salt thereof to form a solution containing a relatively insoluble salt at several times its equilibrium concentration. As a control, each experiment was also conducted in the absence of a precipitation inhibitor.

By titrating a small amount of the solution and thereby determining the concentration of one of its soluble components, the amount of precipitate formed in a particular test solution at a particular time was calculated. I used the well-known Schwarzenbach titration and determined the concentration of the alkaline earth metal cation. At the end of the experiment, the concentration of soluble cation in each control solution, as determined by titration, was considered to be 0% inhibition. If no precipitate formed in an inhibited test solution and it therefore contained all of its original cation content, it was considered to be 100% inhibited. Titration results intermediate to the 0% and 100% inhibition values were directly related to these extremes and converted to percent inhibition.

For example, in the case of the scale-forming salt, calcium carbonate ($CaCO_3$), I added, with agitation, 5 ml. of 0.1 M $CaCl_2$ to a solution containing 490 ml. distilled water and 5 ml. 0.1 M $Na_2CO_3$. In the control experiment no inhibitor was present in the test solution. In other experiments, various amounts of a scale inhibitor were present prior to the addition of the calcium chloride. At the end of the storage period, the control solution contained both soluble calcium and calcium precipitated as calcium carbonate. Titration of the soluble calcium in the control solution by the familiar Schwarzenbach method indicated the concentration of calcium carbonate in solution. This calcium carbonate concentration was the equilibrium concentration under the conditions of the test (pH, temperatures, ionic strength, etc.).

When a few parts per million of my scale inhibitor were present in the test described above, more calcium ion (and therefore more carbonate ion) remained in solution and less calcium carbonate precipitated at the end of the storage test. This greater concentration was confirmed by the titration of calcium in the solutions and related to the equilibrium concentration of the untreated control solution. In the tables, "No. Times Equilibrium Concentration" represents the relative magnitude of the soluble scale-forming salt concentration in the presence of an inhibitor ot the scale-forming salt concentration in the absence of an inhibitor at the temperature of the test. Thus, 4.9 times the equilibrium concentration of $CaCO_3$ at 185° F. means that the concentration of $CaCO_3$ in the inhibited solution was 4.9 times the equilibrium concentration of the control solution at 185° F.

Table I demonstrates the effectiveness of one of the compounds of my invention, pentasodium amino tri (methylphosphonate) $N(CH_2PO_3)_3Na_5H$, in inhibiting the precipitation of various scale-forming compounds after 24 hours storage at room temperature.

The threshold concentrations used in this table are representative of effective inhibitor concentrations but not necessarily minimum concentrations.

TABLE I.—INHIBITION OF PRECIPITATION WITH PENTASODIUM AMINO TRI (METHYLPOSPHONATE) AFTER 24 HOURS STORAGE AT 75° F.

| Scale-Forming Compounds | Equilibrium Concentration (p.p.m.) | No. Times Equil. Conc. | Inhibitor Conc. (p.p.m.) | Percent Inhibition |
|---|---|---|---|---|
| Calcium Carbonate ($CaCO_3$) | 40 | 2.3 | 1 | 100 |
| Calcium Sulfate ($CaSO_4$) | 4,750 | 1.5 | 1 | 100 |
| Barium Sulfate ($BaSO_4$) | 23 | 5.2 | 2.8 | 100 |
| Calcium Oxalate ($CaC_2O_4$) | 19 | 2.7 | 10 | 60 |
| Calcium Phosphate ($CaHPO_4$) | 82 | 2.1 | 10 | 100 |
| Magnesium Silicate ($MgSiO_3$) | 30 | 2.3 | 20 | 50 |
| Calcium Fluoride ($CaF_2$) | 47 | 3 | 10 | 100 |

Table II demonstrates the effectiveness of amino tri (methylphosphonic acid) and various alkali metal and ammonium salts thereof in inhibiting the precipitation of different concentrations of calcium carbonate after 24 hours storage at various temperatures. Tables III and IV are similar, but in Table III the scale-forming compound is calcium sulfate, in Table IV it is barium sulfate, and in both tables the inhibitor concentration is varied. These tales do not represent minimum effective inhibitor concentrations, maximum operating temperatures, or maximum concentrations of scale-forming compound.

TABLE II.—$CaCO_3$ INHIBITION AFTER 24 HOURS STORAGE

| Inhibitor | Equil. Conc. (p.p.m.) | No. Times Equil. Conc. | Temp. (° F.) | Inhibitor Conc. (p.p.m.) | Percent Inhibition |
|---|---|---|---|---|---|
| $N(CH_2PO_3)_3H_6$ | 40 | 2.3 | 75 | 1 | 100 |
| $N(CH_2PO_3)_3Na_5H$ | 40 | 2.3 | 75 | 1 | 100 |
| $N(CH_2PO_3)_3H_6$ | 25 | 3.4 | 130 | 1 | 100 |
| $N(CH_2PO_3)_3(NH_4)_2H_4$ | 25 | 3.4 | 130 | 1 | 100 |
| $N(CH_2PO_3)_3H_6$ | 18 | 4.9 | 185 | 1 | 100 |
| $N(CH_2PO_3)_3(NH_4)_2H_4$ | 18 | 4.9 | 185 | 1 | 100 |
| $N(CH_2PO_3)_3K_2Na_2H_2$ | 18 | 4.9 | 185 | 1 | 100 |
| $N(CH_2PO_3)_3K_2H_4$ | 18 | 4.9 | 185 | 0.5 | 100 |
| $N_2(CH_2)_2(CH_2PO_3)_4H_8$ | 18 | 4.9 | 185 | 0.5 | 100 |
| $N_2(CH_2)_2(CH_2PO_3)_4H_8$ | 18 | 4.9 | 185 | 0.25 | 73 |

TABLE III.—$CaSO_4$ INHIBITION AFTER 24 HOURS STORAGE

| Inhibitor | Equil. Conc. (p.p.m.) | No. Times Equil. Conc. | Temp. (° F.) | Inhibitor Conc. (p.p.m.) | Percent Inhibition |
|---|---|---|---|---|---|
| $N(CH_2PO_3)_3Na_5H$ | 4,750 | 1.5 | 75 | 0.5 | 91 |
| $N(CH_2PO_3)_3Na_5H$ | 4,750 | 1.5 | 75 | 1.0 | 100 |
| $N_2(CH_2)_2(CH_2PO_3)_4H_8$ | 4,750 | 1.5 | 75 | 10.0 | 100 |
| $N(CH_2PO_3)_3Na_5H$ | 4,350 | 2.2 | 75 | 2.8 | 98 |
| $N(CH_2PO_3)_3H_6$ | 4,350 | 2.2 | 75 | 2.5 | 99 |
| $N(CH_2CH_2OH)_2(CH_2PO_3)Na_2$ | 4,200 | 1.6 | 75 | 10.0 | 63 |
| $N(CH_2PO_3)_3Na_5H$ | 3,400 | 2.1 | 130 | 2.8 | 100 |
| $N(CH_2PO_3)_3H_6$ | 3,400 | 2.1 | 130 | 2.3 | 100 |
| $N(CH_2PO_3)_3K_2Na_2H_2$ | 2,850 | 2.4 | 185 | 10.0 | 92 |

TABLE IV.—$BaSO_4$ INHIBITION AFTER 24 HOURS STORAGE

| Inhibitor | Equil. Conc. (p.p.m.) | No. Times Equil. Conc. | Temp. (° F.) | Inhibitor Conc. (p.p.m.) | Percent Inhibition |
|---|---|---|---|---|---|
| $N(CH_2PO_3)_3Na_5H$ | 23 | 5.2 | 75 | 2.8 | 100 |
| $N(CH_2PO_3)_3Na_5H$ | 9 | 6.5 | 130 | 2.8 | 100 |
| $N(CH_2PO_3)_3H_6$ | 9 | 6.5 | 130 | 3.4 | 100 |

Table V demonstrates concentrations of $$N[CH_2PO(OH)_2]_3$$

at which less than 100% inhibition of calcium carbonate precipitation is achieved at differing temperatures after 24 hours storage. There does not appear to be a concentration below which my method is totally ineffective. A very small amount is effective to a correspondingly slight degree. I have been able to observe the threshold effect at as little as 0.1 p.p.m. of amino tri(methylphosphonic acid), but there is no reason to believe that this is a minimum effective concentration.

TABLE V.—$N[CH_2PO(OH)_2]_3$ AFTER 24 HOURS STORAGE

| Scale-Forming Compound | No. Times Equil. Conc. | Temp. (° F.) | $N[CH_2PO(OH)_2]_3$ Concentration, p.p.m. | Percent Inhibition |
|---|---|---|---|---|
| $CaCO_3$ | 3.4 | 130 | 1.0 | 100 |
| | | | 0.5 | 100 |
| | | | 0.25 | 100 |
| | | | 0.1 | 40 |
| $CaCO_3$ | 4.9 | 185 | 2.5 | 100 |
| | | | 1.0 | 100 |
| | | | 0.25 | 70 |

Table VI demonstrates the effectiveness of the compounds of my invention in inhibiting precipitation after the passage of time and under accelerated conditions. Although effectiveness decreases as time passes, the inhibitors of my invention remain effective for longer periods of time than other commercial inhibitors, including the widely used inorganic polyphosphates.

TABLE VI.—PERCENT INHIBITION USING $CaSO_4$ AT 2.3 TIMES EQUILIBRIUM CONCENTRATION AND 130° F.

| Time (days) | Control | $N(CH_2PO_3)_3Na_5H$ | | $N[CH_2PO(OH)_2]_3$ | |
|---|---|---|---|---|---|
| | | 2.8 p.p.m. | 5.6 p.p.m. | 3.35 p.p.m. | 6.7 p.p.m. |
| 1 | 7 | 100 | 100 | 100 | 100 |
| 2 | ------- | 76 | 100 | 100 | 100 |
| 4 | 0 | 48 | 100 | 100 | 100 |
| 7 | 0 | 17 | 100 | 82 | 97+ |

Similar experiments carried out in a strong brine solution consisting of 10% sodium chloride, 10 p.p.m. amino tri (methylphosphonic acid) and 1.6 times the equilibrium concentration of calcium sulfate showed 100% inhibition after 24 hours.

Also, similar experiments carried out in acid solution (pH 2.5–3.0) and in the presence of 1.25 times the equilibrium concentration of calcium sulfate and 10 p.p.m. of amino tri (methylphosphonic acid) showed 95% inhibition after 24 hours storage. I conclude, therefore, that the inhibitors of my invention are also effective in brine and acid solutions.

In addition to these laboratory experiments, the compounds of my invention have also been used as precipitation and scale inhibitors in actual applications, an example of which is the following.

In an oil field application in the Oklahoma area, produced water from the downhole formation was mixed with the water flood supply water source. The produced water contained 50–180 p.p.m. barium ion and the supply water about 500 p.p.m. of sulfate ion. Approximately 300 barrels of produced water per day were cascaded down the annulus of the supply well, commingled with the supply well water and approximately 2,000 barrels of the composite water per day pumped out of the well into a raw water storage tank.

Prior to treatment with my inhibitor, a 1" x 2" test coupon installed at the well head of the supply well and in contact with the mixture of waters became covered with two grams of barium sulfate after 30 days exposure.

During the next 30 days, one of my inhibitors, $N(CH_2PO_3)_3Na_5H$, was added to the produced water immediately ahead of the supply well to maintain a concentration of inhibitor coming out of the supply well at 2.6 parts per million. At the end of this period, the 1" x 2" coupon was free of any barium sulfate deposit.

Actual applications generally subject the compounds of my invention to less vigorous conditions than laboratory experiments. Concentrations of precipitating ions found in practice are generally lower than those used in the laboratory. Moreover, the usual commercial procedure involves continuous addition of fresh inhibitor to a dynamic scale-forming system. Therefore, my inhibitors may be effectively used commercially at lower concentrations and over longer storage periods than indicated by laboratory data.

Thus, it is seen that my invention relates to methods of inhibiting precipitation and scale formation in aqueous media, comprising adding thereto amino methylphosphonic acid or its alkali metal and ammonium salts or combinations thereof. I do not intend to be limited to the specific salts, methods, temperatures, concentrations, and lengths of time disclosed herein for illustrative purposes. My invention may be otherwise practiced and embodied within the scope of the following claims.

I claim:

1. A method of inhibiting the precipitation of scale-forming salts in an aqueous system comprising adding to said system a compound of the general formula

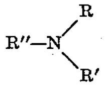

where R is

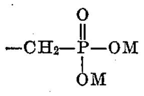

R' is selected from the group consisting of R and $—CH_2CH_2OH$, and R'' is selected from the group consisting of R, $—CH_2CH_2OH$, and

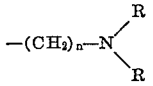

where each M is independently selected from the group consisting of H, $NH_4$, and alkali metal, "$n$" is a whole number from 1 to 3, the amount of said compound added being a threshold amount in a weight ratio of said compound to the cation component of said scale forming salts not in excess of 0.5 to 1, and which amount is less than that which would cause turbidity removable by a sequestering amount of said compound.

2. A method of inhibiting the precipitation of scale-forming salts in an aqueous system comprising adding to said system a compound of the formula

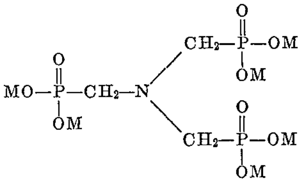

where each M is independently selected from the group consisting of H, $NH_4$, and alkali metal, the amount of said compound added being a threshold amount in a weight ratio of said compound to the cation component of said scale forming salts not in excess of 0.5 to 1, and which amount is less than that which would cause turbidity removable by a sequestering amount of said compound.

3. A method of inhibiting the precipitation of scale-forming salts in an aqueous system comprising adding to said system a compound of the formula

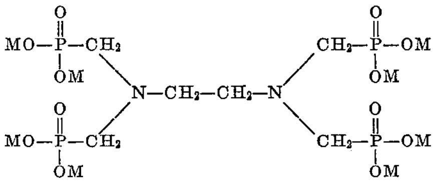

where each M is independently selected from the group consisting of H, $NH_4$ and alkali metal, the amount of said compound added being a threshold amount in a weight ratio of said compound to the cation component of said scale forming salts not in excess of 0.5 to 1, and which amount is less than that which would cause turbidity removable by a sequestering amount of said compound.

4. A method of inhibiting the precipitation of scale-forming salts in an aqueous system comprising adding to said system a compound of the formula

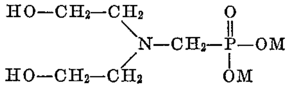

where each M is independently selected from the group consisting of H, $NH_4$ and alkali metal, the amount of said compound added being a threshold amount in a weight ratio of said compound to the cation component of said scale forming salts not in excess of 0.5 to 1, and which amount is less than that which would cause turbidity removable by a sequestering amount of said compound.

5. A method of inhibiting the precipitation of scale-forming salts in a water system comprising adding to said system no more than a threshold amount of a compound of the general formula

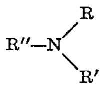

where R is

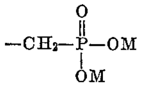

R′ is selected from the group consisting of R and $-CH_2CH_2OH$, and R″ is selected from the group consisting of R, $-CH_2CH_2OH$, and

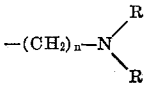

where each M is independently selected from the group consisting of H, $NH_4$ and alkali metal, "$n$" is a whole number from 1 to 3.

6. A method of inhibiting the precipitation of scale-forming salts in a water system comprising adding to said system no more than a threshold amount of a compound of the formula

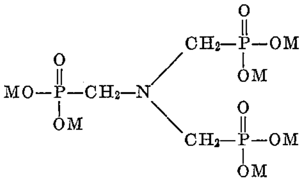

where each M is independently selected from the group consisting of H, $NH_4$, and alkali metal.

7. A method of inhibiting the precipitation of scale-forming salts in a water system comprising adding to said system no more than a threshold amount of a compound of the formula

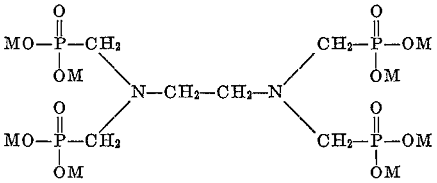

where each M is independently selected from the group consisting of H, $NH_4$ and alkali metal.

8. A method of inhibiting the precipitation of scale-forming salts in a water system comprising adding to said system no more than a threshold amount of a compound of the formula

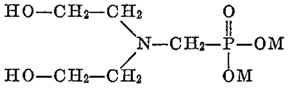

where each M is independently selected from the group consisting of H, $NH_4$ and alkali metal.

9. A method of inhibiting the deposition of scale-forming alkaline earth metal carbonates, sulfates, oxalates, phosphates, fluorides, and silicates on a metal surface in contact with solutions thereof comprising adding to said solutions a compound of the general formula

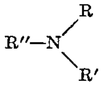

where R is

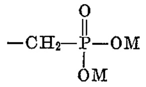

R′ is selected from the group consisting of R and $-CH_2CH_2OH$, and R″ is selected from the group consisting of R, $-CH_2CH_2OH$, and

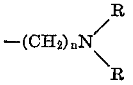

where each M is independently selected from the group consisting of H, $NH_4$, and alkali metal, "$n$" is a whole number from 1 to 3, the amount of said compound added being no more than a threshold amount up to about 100 p.p.m., and in a weight ratio of said compound to the cation component of said scale-forming salts not in excess of 0.5 to 1.

10. Method of claim 9 in which the concentration of said compound in said system does not exceed about 25 parts by weight per million parts of water.

11. A methods of inhibiting the deposition of scale-forming alkaline earth metal carbonates, sulfates, oxalates, phosphates, fluorides, and silicates on a metal surface in contact with solutions thereof comprising adding to said solutions a compound of the formula

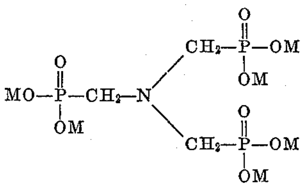

where each M is independently selected from the group consisting of H, $NH_4$, and alkali metal, the amount of said compound added being no more than a threshold amount up to about 100 p.p.m., and in a weight ratio of said compound to the cation component of said scale-forming salts not in excess of 0.5 to 1.

12. Method of claim 11 in which the concentration of said compound in said system does not exceed about 25 parts by weight per million parts of water.

13. A method of inhibiting the deposition of scale-forming alkaline earth metal carbonates, sulfates, oxalates, phosphates, fluorides, and silicates on a metal surface in contact with solutions thereof comprising adding to said solutions a compound of the formula

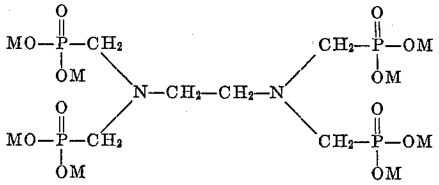

where each M is independently selected from the group consisting of H, $NH_4$ and alkali metal, the amount of said compound added being no more than a threshold amount up to about 100 p.p.m., and in a weight ratio of said compound to the cation component of said scale-forming salts not in excess of 0.5 to 1.

14. Method of claim 13 in which the concentration of said compound in said system does not exceed about 25 parts by weight per million parts of water.

15. A method of inhibiting the deposition of scale-forming alkaline earth metal carbonates, sulfates, oxalates, phosphates, fluorides, and silicates on a metal surface in contact with solutions thereof comprising adding to said solutions a compound of the formula

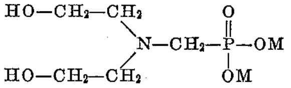

where each M is independently selected from the group consisting of H, $NH_4$ and alkali metal, the amount of said compound added being no more than a threshold amount up to about 100 p.p.m., and in a weight ratio of said compound to the cation component of said scale-forming salts not in excess of 0.5 to 1.

16. Method of claim 15 in which the concentration of said compound in said system does not exceed about 25 parts by weight per million parts of water.

References Cited

UNITED STATES PATENTS

| | | | |
|---|---|---|---|
| 2,599,807 | 6/1952 | Bersworth | 260—500 |
| 2,841,611 | 7/1958 | Bersworth | 260—500 |
| 2,917,528 | 12/1959 | Ramsey et al. | 260—500 X |
| 3,160,632 | 12/1964 | Toy et al. | 252—180 |
| 3,234,124 | 2/1966 | Irani | 210—58 |

OTHER REFERENCES

Betz Handbook of Industrial Water Conditioning, Betz Laboratories, Inc., Philadelphia 24, Pa., Fifth Edition, 1957, pp. 90–94, 148–151 and 160–162.

"Scale"—Webster's New International Dictionary, Second Edition Unabridged, p. 2227.

Martell, A. E. et al., Chemistry of The Metal Chelate Compounds, 1952, Prentice-Hall, Englewood Cliffs, N.J., pp. 490–495 relied on.

MORRIS O. WOLK, *Primary Examiner.*

MICHAEL E. ROGERS, *Examiner.*